(12) United States Patent
Matsuda et al.

(10) Patent No.: US 7,343,859 B2
(45) Date of Patent: Mar. 18, 2008

(54) SQUIB

(75) Inventors: Kazuo Matsuda, Shioya-gun (JP);
Kazutaka Saito, Kawachi-gun (JP);
Etsuya Miyake, Utsunomiya (JP);
Junichi Nishimura, Shimotsuga-gun
(JP); Hiromi Aida, Kanuma (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 10/982,417

(22) Filed: Nov. 5, 2004

(65) Prior Publication Data

US 2005/0155509 A1   Jul. 21, 2005

(30) Foreign Application Priority Data

Nov. 10, 2003 (JP) ............................. 2003-379873
Dec. 17, 2003 (JP) ............................. 2003-419479

(51) Int. Cl.
*F42B 3/12* (2006.01)

(52) U.S. Cl. .............. 102/217; 102/202.9; 102/202.14; 280/741

(58) Field of Classification Search ................ 102/217, 102/202.9, 202.14, 202.7; 280/741
See application file for complete search history.

(56) References Cited

U.S. PATENT DOCUMENTS

| | | | |
|---|---|---|---|
| 5,140,906 A * | 8/1992 | Little, II ................ | 102/202.14 |
| 5,142,982 A | 9/1992 | Diepold et al. | |
| 5,831,203 A | 11/1998 | Ewick | |
| 5,847,309 A | 12/1998 | Baginski | |
| 5,905,226 A | 5/1999 | Baginski | |
| 5,969,286 A | 10/1999 | Ward et al. | |
| 6,155,171 A | 12/2000 | Haegeman et al. | |
| 6,166,452 A | 12/2000 | Adams et al. | |
| 6,192,802 B1 * | 2/2001 | Baginski ................. | 102/202.2 |
| 6,354,217 B1 | 3/2002 | Narumi et al. | |
| 6,467,414 B1 * | 10/2002 | Fisher ..................... | 102/202.4 |
| 6,557,474 B1 * | 5/2003 | Morte et al. ............. | 102/202.1 |
| 6,584,911 B2 | 7/2003 | Bergerson et al. | |
| 6,601,514 B1 | 8/2003 | Bretfeld et al. | |
| 6,659,500 B2 * | 12/2003 | Whang et al. ............. | 280/741 |
| 6,892,643 B2 * | 5/2005 | Jennings, III .......... | 102/202.14 |
| 7,107,908 B2 * | 9/2006 | Forman et al. .......... | 102/202.5 |
| 2001/0022146 A1 * | 9/2001 | Duvacquier et al. ..... | 102/202.2 |

FOREIGN PATENT DOCUMENTS

| | | |
|---|---|---|
| EP | 0 429 229 A2 * | 5/1994 |
| EP | 0805074 A | 11/1997 |
| EP | 0888227 B1 | 1/1999 |

(Continued)

*Primary Examiner*—Stephen M Johnson
(74) *Attorney, Agent, or Firm*—Carrier, Blackman & Associates, P.C.; Joseph P. Carrier; William D. Blackman

(57) ABSTRACT

A squib for bus connection includes a communication and ignition unit which is connected via a pin to a bus line and is received within an inner cap, along with a quantity of a first explosive which does not emit corrosive gas. Furthermore, between this inner cap and an outer cap in which it is received, there is charged a quantity of a second explosive which is of a different type from the first explosive, the second explosive being of a type which is used in a squib in a conventional inflator.

12 Claims, 8 Drawing Sheets

FOREIGN PATENT DOCUMENTS

| | | |
|---|---|---|
| FR | 2 772 909 | 12/1997 |
| JP | 57-142498 | 9/1982 |
| JP | 07-92359 | 10/1995 |
| JP | 10154992 | 6/1998 |
| JP | 2000124932 | 4/2000 |
| JP | 2000241098 | 9/2000 |
| JP | 2002-535195 | 10/2002 |
| JP | 2004-203294 | 7/2004 |
| WO | WO 01/34536 A | 5/2001 |
| WO | WO 03/064220 A | 8/2003 |
| WO | WO 03/091077 A | 11/2003 |

\* cited by examiner

PRIOR ART

PRIOR ART

PRIOR ART

SQUIB

BACKGROUND OF THE INVENTION

1. Field of the Invention

Priority is claimed on Japanese Patent Application No. 2003-379873, filed Nov. 10, 2003, and Japanese Patent Application No. 2003-419479, filed Dec. 17, 2003, the contents of which are incorporated herein by reference.

The present invention relates to a squib (an ignition apparatus) which is used in a system which employs explosive, such as, for example, an air bag device or a pretensioner apparatus for an automobile, and particularly relates to a squib which incorporates an ignition element which can be ignited with low energy.

2. Background Art

Occupant protection apparatuses such as pretensioner apparatuses and airbag apparatuses that are mounted in automobiles operate by being ignited by a squib (i.e., an ignition apparatus) in which a gas generating agent is contained in an inflator, and high pressure gas that is generated by the combustion thereof is introduced into an airbag or the like.

A squib is constructed such that an igniting element is mounted on a header to which is fixed a connecting terminal in the form of a pin. In addition, an igniting agent in the form of an explosive is inserted under pressure into a cap so as to be in contact with the igniting element. The pin that is fixed to the header is electrically connected with a master control unit.

In recent years, many protective devices for passengers riding in vehicles have come to be mounted to the vehicles, such as air bag devices or the like which deploy from the steering wheel, the side portions of the seats, and the side portions of the roof; and, in order to answer requirements related to these, various inventions have been proposed in relation to connecting such a protective device for vehicle passengers to a control bus for the vehicle as a whole (for example, refer to Japanese Patent Unexamined Publication No. H10-154992).

Furthermore, in line with this ongoing process of bus connection, inventions have also been proposed related to squibs which are internally fitted with ICs (integrated circuits) for communication and ignition (for example, refer to Japanese Patent 3,294,582).

Furthermore, since a squib is a device which operates a system such as an air bag device or a pre-tensioner device or the like, it is used with the objective of igniting the material which is used for evolving gas. FIGS. 9 and 10 show an example of this type of prior art squib. As shown in these figures, the squib 130 comprises a quantity of explosive 135, which is a so called igniter material and is stored internally, and a header 132; a fine wire (a bridging wire) 131 which is made from a material such as nickel-chrome or platinum is welded to the header 132, and pins 133 and 134 are formed as projecting from the header 132. And an external control unit (not shown in the figures) is connected to these pins 133 and 134 of the squib 130, and, when electrical current is supplied to these pins 133 and 134 from said control unit, the Joule heat generated due to the electrical resistance of the fine bridging wire 131 causes the explosive 135 to be ignited.

Furthermore, in recent years, the number of air bags or pre-tensioners which are fitted to an automobile has had a great tendency to increase. In order to cater for this tendency, as shown in FIG. 11, a technique has been proposed in which a plurality of squibs 140 are connected in parallel upon a pair of wires 142 (a bus connection), and the function of electrical power supply and the function of communication are both simultaneously fulfilled by this two wire bus 142, so that, by performing ignition control by communication commands from a control unit 141, it is possible to dispense with any harness (refer to Japanese Patent Unexamined Publication Nos. H10-154992 and 2000-124932).

In the case of a squib to be utilized with this bus connection, although it is necessary to assemble a communication ignition circuit and a capacitor for ignition to a general purpose type squib according to the prior art, alternatively a squib 140 has been proposed, as shown in FIG. 12, in which a communication ignition circuit 143 and a capacitor for ignition 144 are assembled directly to the squib (refer to Japanese Patent Unexamined Publication No. 2000-241098).

In this case, when a structure is utilized in which a plurality of squibs are connected to a bus, since it is necessary for all of these squibs to be supplied with electrical power from the bus, accordingly it is also necessary for the energy which is required for ignition to be about 1/100 of that required for a general purpose type squib according to the prior art. Due to this, squibs have been proposed which are equipped with ignition elements which can be ignited with low energy (refer to U.S. Pat. Nos. 5,847,309, 5,905,226 and 6,192,802).

As such a type of low energy squib, as shown in FIG. 13, a technique is currently under test in which, by housing a communication circuit, an ignition circuit, and an ignition element within a single package 151, and by housing that package 151 internally within a squib 150 which is formed in the same external shape as a squib according to the prior art, the squib can be directly connected to the bus of the vehicle without making any changes to a passenger restraint device which is already in existence.

Thus, with such a squib which is equipped with an internal IC, there is the beneficial aspect that it is easy to fit it to an inflator device which is already in existence, since, along with the shape of the squib being the same as that of the corresponding prior art component, the ignition element is integrated with the IC.

However, with a structure in which the ignition element is integrated with the IC, since the explosive and the IC are both housed within the cap, it is desirable to provide some type of construction for protecting the ignition element and the IC from gas which is emitted from the explosive over time.

The present invention has been conceived in the light of the above problem, and one of its objects is to provide a squib which, while maintaining its function as a squib, also protects the ignition element and IC from gas which is emitted by the explosive.

Furthermore, in the case of a low energy squib, it is necessary to house the communication and ignition circuit within the header, and moreover it is also necessary to form the ignition element within the ignition circuit. Due to this, it is necessary to preserve a certain empty space within the structure of the header, and accordingly the problem arises that the burden of work when processing the header is increased, and accordingly the cost is increased. Furthermore, since the external shape of this squib is required to be the same as that of a prior art general purpose type squib, it is also necessary to make the communication and ignition circuit package as compact as possible, and accordingly the problem arises that the level of difficulty becomes very great when housing the capacitor for ignition in this package. Yet further, in order to be able to anticipate increased reliability for ignition, it is necessary to preserve close contact between the flammable material (the explosive) and the ignition element; but, in order to do so, it becomes necessary to perform the task of pressure packing for pressing the flammable material into place, and the problem arises that, due to the shape of the circuit package, the work involved cannot be performed without an additional separate process.

Accordingly, the present invention has been conceived in the light of the above problem as well, and another of its objectives is to provide, as a means for solving the above described problems, a low energy squib which, while lowering the work burden, reducing the cost, and providing more reliable ignition, does not require addition of any changes to currently existing restraint devices for persons riding in a vehicle, and which can be connected to the bus.

SUMMARY OF THE INVENTION

In order to solve the above described problems, according to a first aspect of the present invention there is provided a squib (such as, for example, the squibs $2a$, $2b$, $2c$, ... of the subsequently described preferred embodiments) of which a plurality are connected via a common bus line (such as, for example, the bus line 3 of the subsequently described preferred embodiments) to a control device (such as, for example, the control device 1 of the subsequently described preferred embodiments), and which is adapted for bus connection so as to be capable of selective operation according to electrical energy (for example, the electrical power in the subsequently described preferred embodiments) and an electrical signal (such as, for example, the control signal and the ignition signal of the subsequently described preferred embodiments) supplied from said control device, wherein: a communication and ignition unit (such as, for example, communication and ignition unit 50 of the subsequently described preferred embodiments), which comprises a communication and ignition circuit (such as, for example, the control circuit 21 which is mounted upon an IC substrate board 52 of the subsequently described preferred embodiments) which is electrically connected with said bus line and an ignition element (such as, for example, the ignition element 30 of the subsequently described preferred embodiments) which is connected to said communication and ignition circuit, is received in an inner cap (such as, for example, the inner cap 41 of the subsequently described preferred embodiments) along with a quantity of a first explosive (such as, for example, the first explosive $54a$ of the subsequently described preferred embodiments); and a quantity of a second explosive (such as, for example, the second explosive $54b$ of the subsequently described first preferred embodiment), which is of a different type from said first explosive, is charged between said inner cap and an outer cap (such as, for example, the outer cap 42 of the subsequently described preferred embodiments) which receives said inner cap.

Furthermore, according to a second aspect of the present invention there is provided a squib of which a plurality are connected via a common bus line to a control device, and which is adapted for bus connection so as to be capable of selective operation according to electrical energy and an electrical signal supplied from said control device, wherein: a communication and ignition unit, which comprises a communication and ignition circuit which is electrically connected with said bus line and an ignition element which is connected to said communication and ignition circuit, is received in a first chamber (such as, for example, the interior of the inner cap 41 of the subsequently described preferred embodiments) along with a quantity of a first explosive; and a quantity of a second explosive, which is of a different type from said first explosive, is charged in a second chamber (such as, for example, the gap between the inner bottom surface 42A of the outer cap 42, and the outer bottom surface 41B of the inner cap 41, of the subsequently described preferred embodiments), which is cut off, with regard to gas flow, from said first chamber by a partition wall (such as, for example, the inner cap 41 of the subsequently described preferred embodiments).

Yet further, according to a third aspect of the present invention, it is desirable to utilize, for said first explosive, an explosive which does not emit any corrosive gas (such as, for example, in the subsequently described preferred embodiments, tricyanate or the like).

According to the above described structure, even if gas is emitted from the second explosive, it does not come into contact with the ignition element or with the communication and ignition circuit, since the flow conduit for said gas via the inner cap and/or the partition wall is interrupted.

Moreover, according to a fourth aspect of the present invention there is provided a squib (such as, for example, the squib 101 of the subsequently described preferred embodiments) of which a plurality are connected via a common bus line to a control device, and which is adapted for bus connection so as to be capable of selective operation according to electrical energy and an electrical signal supplied from said control device, wherein: a header section (such as, for example, the header section 104 of the subsequently described preferred embodiments), an explosive section (such as, for example, the flammable material 109 of the subsequently described preferred embodiments), and a communication and ignition circuit (such as, for example, the IC ignition circuit 106 of the subsequently described preferred embodiments) are formed separately, and, between said header section and said explosive section, there is formed a package (such as, for example, the package 102 of the subsequently described preferred embodiments) in which said communication and ignition circuit is disposed, with a capacitor (such as, for example, the capacitor 105 of the subsequently described preferred embodiments) for ignition being housed in said package.

According to this fourth aspect, by forming said communication and ignition circuit and said explosive section as separate from said header, it is possible to simplify the manufacture of said header, and it is accordingly possible to anticipate a reduction in the burden and in the cost of the work. Furthermore, since it becomes unnecessary to assemble said ignition assembly within said package, accordingly it becomes possible to ensure the internal space for housing the capacitor for ignition, so that it is possible to simplify the process of assembly of the squib, thus making it possible to anticipate a reduction in the burden of the work involved. Yet further, by forming said package and said ignition element as separate elements, it becomes possible to manufacture the various elements while benefiting from division of labor, so that it also becomes possible to enhance the effectiveness of production.

Finally, according to a fifth aspect of the present invention there is provided a squib as described above, in which, further, the outer shape of said package is formed as a circular cylinder, and an ignition element (such as, for example, the ignition element 103 of the subsequently described preferred embodiments) is connected to the tip end surface thereof.

According to this fifth aspect, by forming the outer shape of said package as a circular cylinder, along with it being possible to simplify the shape of said package, it also becomes possible to ensure closeness of contact by compressing said flammable material in an even manner, since said package is inserted with said ignition element into the flammable material.

According to the first and the second aspects of the present invention, since, even if gas is emitted from the second explosive, the flow of said gas is intercepted by the inner cap or by the partition wall, and said gas is accordingly prevented from coming into contact with the ignition element or with the communication and ignition circuit, accordingly, for the first explosive, it is possible to utilize an explosive which, to the utmost extent possible, avoids exerting any influence upon the ignition element or upon the communication and ignition circuit; while, for the second explosive, it is possible to utilize an explosive which is most suitable to implement the basic function of the squib.

According to the third aspect of the present invention, it is possible even more effectively to prevent any influence due to gas emitted from the first explosive being exerted upon the ignition element or upon the communication and ignition circuit.

According to the fourth aspect of the present invention, it is possible to anticipate a reduction in the burden of the work and in the cost thereof, and, along with ensuring a good ignition performance which can perform ignition at low energy, it is also possible to connect this device to the bus of the vehicle, without making any change to a passenger restraint device which is already fitted to the vehicle; in other words, this squib may be retrofitted to a currently existing passenger restraint device.

According to the fifth aspect of the present invention, it is possible to keep said flammable material uniformly compressed and to maintain it in its tightly packed state.

DESCRIPTION OF THE PREFERRED EMBODIMENTS

In the following, the first preferred embodiment of the present invention will be explained with reference to FIGS. 1 through 4.

It should be understood that the squib according to this first preferred embodiment is most suitable for use in a protective device for persons riding in a vehicle, such as in an air bag device or a pre-tensioner device or the like which is mounted to, for example, an automobile. In the following, by way of example, the explanation will be made for the case of a protective device for persons riding in a vehicle incorporating this squib according to the first preferred embodiment being mounted to an automobile.

Figure 1:
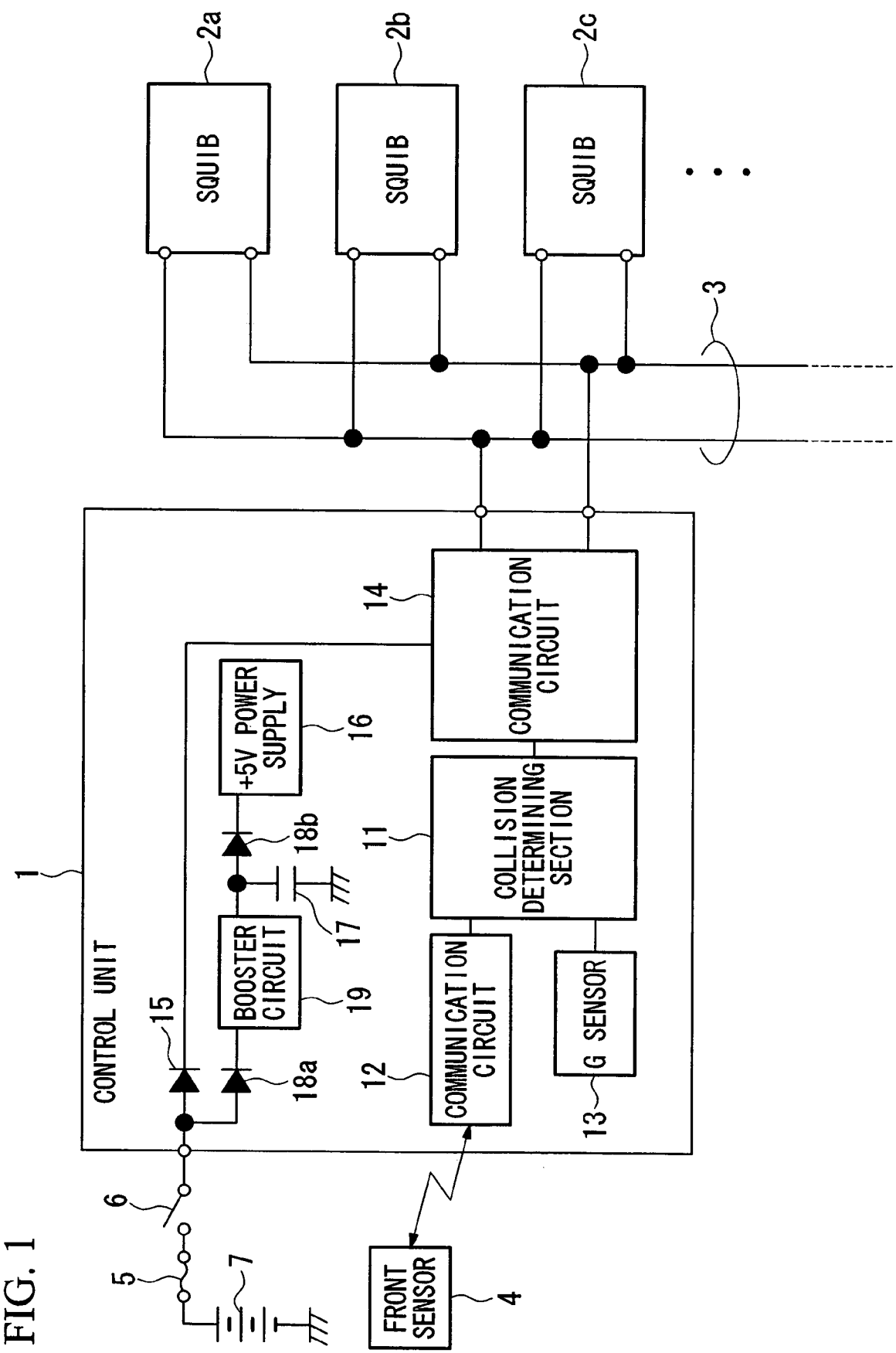
FIG. 1 is a block diagram of an ignition system which comprises a squib according to a first preferred embodiment of the present invention.

Referring to FIG. 1, the control unit 1 is a control section which constitutes the central portion of a passenger protective device which protects persons riding in the vehicle from any collision in which the vehicle is involved, and squibs 2a, 2b, 2c, . . . of a plurality of auxiliary restraint devices (not shown in the figures) which are provided in locations in the vehicle for protecting persons riding in said vehicle (said squibs being provided in one to one correspondence with said auxiliary restraint devices) are connected to the control unit 1 using an unbalanced type of bus line 3 in which, for example, a pair of wires are provided. It should be understood that the squibs 2a, 2b, 2c, . . . are devices which operate the auxiliary restraint devices by taking advantage of flammable material (an explosive which consists of material in the auxiliary restraint devices which evolves gas when fire is applied to it), and they internally store this flammable material 54, and operate the auxiliary restraint devices by igniting this flammable material 54 based upon an ignition execute signal (an ignition execute command) which has been emitted from the control unit 1 to the communication address of the squib 2a, 2b, 2c, . . . as a command Furthermore, a collision determination section 11 is comprised in the control unit 1, and this operates by means of a CPU (a central processing device): and this collision determination section 11 decides whether or not, due to the vehicle colliding with another object, a shock has been applied which makes it necessary to operate the protective devices for the persons riding in the vehicle, based upon the output signal of a front sensor 4 which, along with being provided at the frontal portion of the vehicle, is connected via a communication circuit 12 and detects the acceleration due to deformation of the frontal portion of the vehicle, and upon the output signal of a G sensor 13 which, along with being provided to the control unit 1, detects the acceleration of the vehicle.

On the other hand, along with electrical power (electrical energy) being supplied via the bus line 3 to the squibs 2a, 2b, 2c, . . . , there is provided to the control unit 1 a communication circuit 14 for performing communication with the squibs 2a, 2b, 2c, . . . for which communication addresses are designated via control signals (electrical signals), and, if the collision determination section has decided that an unnecessary shock has been applied to the vehicle due to the vehicle colliding with another object, then an ignition execute signal (an ignition execute command) is dispatched by the communication circuit 14 via the bus line 3 to the squibs 2a, 2b, 2c, . . . for operating the auxiliary restraint devices (not shown in the figures).

Furthermore, a vehicle battery 7 is connected to the control unit 1 via a fuse 5 for preventing excess current and via an ignition switch (IG.SW) 6, and is charged up with electrical power and is utilized by the vehicle, and, along with electrical power from this vehicle battery 7 which has been inputted being supplied to a +5V power source 16 which generates electrical power for the CPU and the like which constitute the collision determination section 11, this power is also supplied, via a protective diode 15 which prevents reverse flow of electrical current, to a communication circuit 14 which supplies electrical power to the squibs 2a, 2b, 2c. Moreover, the control unit also comprises a backup capacitor 17 which stores electrical power and backs up the power source so as to allow the control unit 1 to operate for a certain time period even if the supply of electrical power from the vehicle battery 7 is cut off, protective diodes 18a and 18b for charging up this backup capacitor 17, a voltage rise or booster circuit 19, and the like.

It should be understood that in the following, by way of example, only the squib 2a will be explained, since all the squibs 2a, 2b, 2c, . . . which are connected to the common bus line 3 have the same structure.

Figure 2:
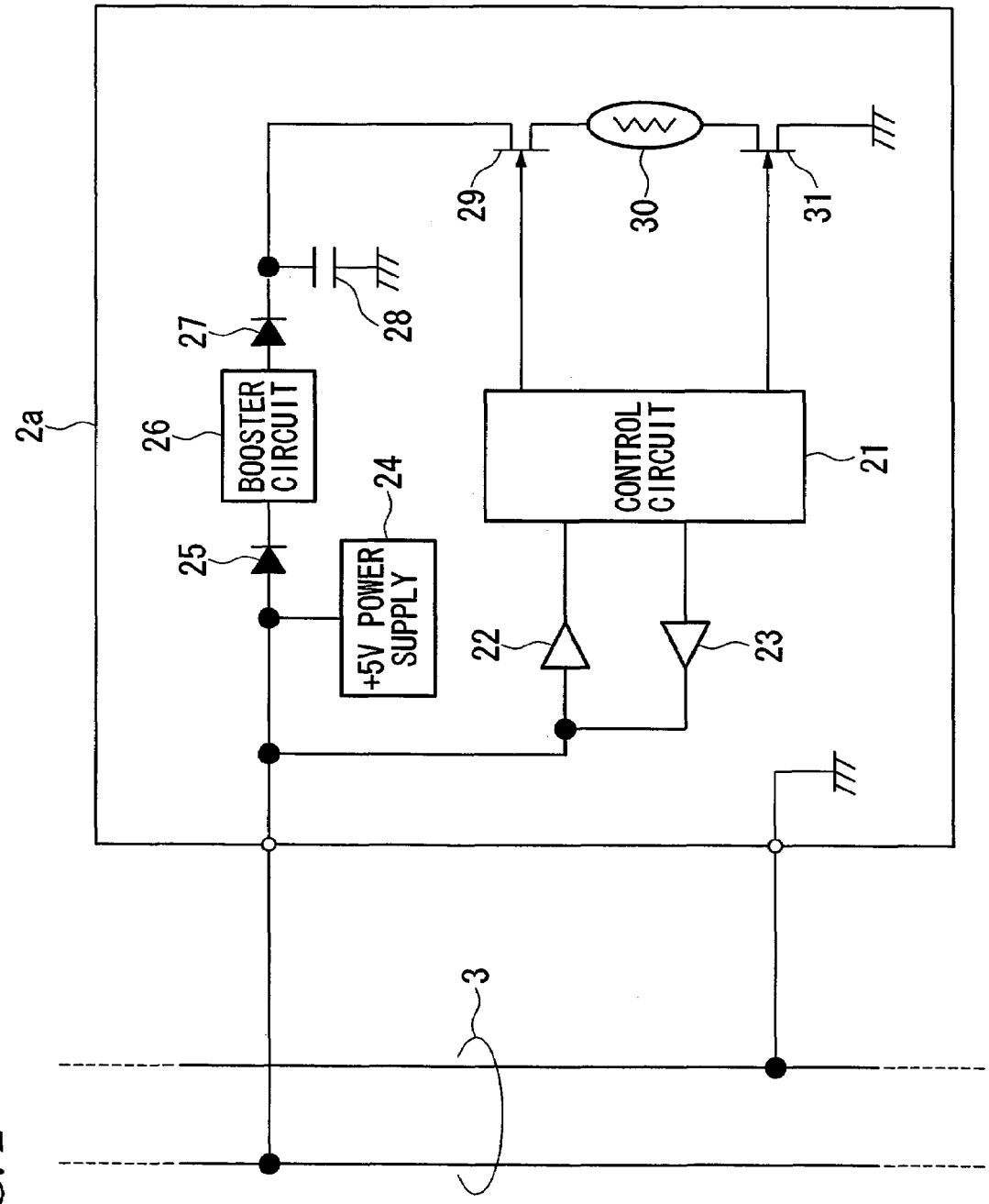
FIG. 2 is a block diagram of this squib according to the first preferred embodiment.

As shown in FIG. 2, a control circuit 21 which performs diagnosis of communication via the bus line 3 and ignition control based upon orders from the control unit 1 is provided to the squib 2a, and, along with control signals (commands) being inputted to the control circuit 21 via a receive buffer 22 from the bus line 3, response signals (responses) are also outputted from the control circuit 21 via a send buffer 23 to the bus line 3.

The electrical power which is supplied from the bus line 3, along with being supplied to the +5V power source 24 which generates electrical power for the control circuit 21 and the like, is also supplied, via a protective diode 25, to a voltage rise or booster circuit 26 which generates the electrical power which is required in order for the squib 2a to ignite the flammable material so as to operate its auxiliary restraint device.

A capacitor 28 is connected via a protective diode 27 to the output of the voltage rise circuit 26, and is made so as to be able to accumulate the electrical power whose voltage has been raised by the voltage rise circuit 26, and which is required in order for the squib 2a to ignite the flammable material so as to operate the auxiliary restraint device.

To the output (the cathode terminal) of the protective diode 27, in parallel with the capacitor 28, there are connected, in series, a switching element 29, an ignition element 30 for igniting the flammable material which is stored in the squib 2a, and a switching element 31. In concrete terms, one terminal of the ignition element 30 is connected via the switching element 29 to the output of the protective diode 27, while the other terminal of said ignition element 30 is connected to ground via the switching element 31. The control terminals which control the switching element 29 and the switching element 31 to be conductive or interrupted are also both connected to the control circuit 21.

Figure 3:
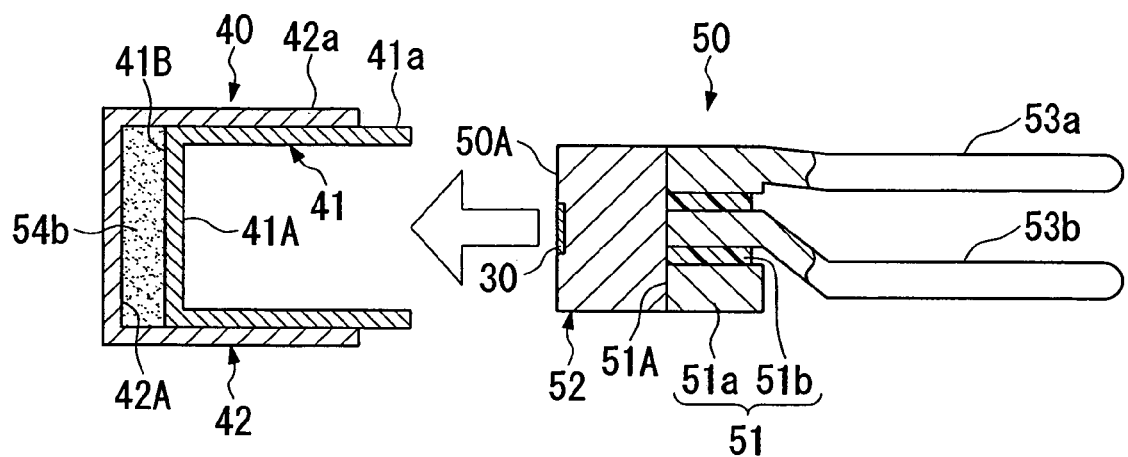
FIG. 3 is an exploded sectional view of this squib according to the first preferred embodiment.
Figure 4:
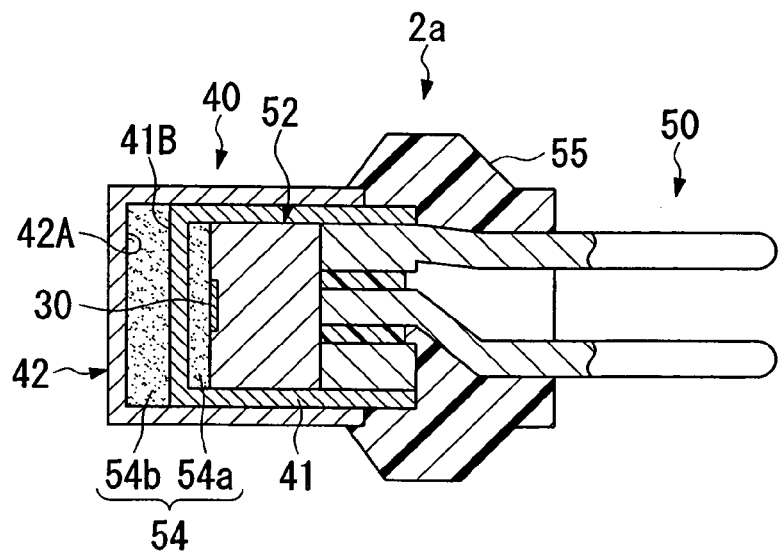
FIG. 4 is a vertical sectional view of this squib according to the first preferred embodiment.

As shown in FIGS. 3 and 4, the squib 2a comprises a cap unit 40 which is formed in the shape of a cylindrical tube with a bottom, and a communication and ignition unit 50 which is coaxially received in said cap unit 40.

Furthermore, to consider the cap unit 40 and the communication and ignition unit 50, an inner cap 41 which is an essential structural element of the cap unit 40, and a header 51 which is an essential structural unit of the communication and ignition unit 50 are integrated into one unit by, for example, laser welding or the like, and the vicinity of the opening portion of the cap unit 40 is closed up by a resin molding 55.

The cap unit 40 comprises an inner cap 41 which is shaped as a circular cylinder which has a bottom and into which the communication and ignition unit 50 is coaxially inserted, and an outer cap 42 which is shaped as a circular cylinder which has a bottom and into which said inner cap 41 is coaxially inserted; and these caps 41 and 42, which are made from a metallic material such as stainless steel or the like, are mutually connected together by, for example, laser welding or the like.

And the first explosive powder 54a is pressure-packed into the inner portion of the inner cap 41 (i.e. into a first chamber)—in more concrete terms, into the gap which is defined between the inner bottom surface (the inner wall) 41A of the inner cap 41 and the tip end surface (the outer wall) 50A of the communication and ignition unit 50—and, furthermore, the second explosive 54b is pressure-packed into the gap (i.e. into a second chamber) which is defined between the inner bottom surface (the inner wall) 42A of the outer cap 42 and the outer bottom surface (the outer wall) 41B of the inner cap 41.

The communication and ignition unit 50 comprises a header 51 which includes a header main body 51a which is electrically conductive and an insulating member 51b at the inner portion of said header main body 51a and shaped as a tube, and an IC main board 52 for communication and ignition which is connected to the tip end of said header 51, for example by welding or the like; and in the header 51 there are fixed two pins 53a and 53b, which are connection terminals to the two wire type bus line 3 which is the external signal line.

Furthermore, the above described control circuit 21, receive buffer 22, send buffer 23, +5V power source 24, protective diode 25, voltage rise circuit 26, protective diode 27, capacitor 28, switching element 29, ignition element 30, and switching element 31 are mounted to the IC main board 52.

The first explosive 54a is in direct contact with the IC main board 52. And for the first explosive 54a, in order to ensure protection of the condition of the components such as the control circuit 21 and the ignition element 30 and so on which are mounted to the IC main board 52 from deterioration by gas which is emitted by said first explosive 54a, there is used an explosive which does not emit corrosive gas, such as for example lead trinitroresorcinate $(C_6H(NO_2)_3 O_2Pb)$ or the like.

On the other hand, the second explosive 54b is kept in a state in which any gas which is emitted by said second explosive 54b cannot penetrate through to the side of the IC main board 52, since it is isolated by the inner cap 41 so that to be kept out of contact with the IC main board 52. Thus, an explosive of the same type as is used for the material which evolves gas in a conventional type squib may be utilized as the second explosive 54b, such as for example ZPP or the like.

As per the above, the flammable material 54 which ignites the material which evolves gas of the auxiliary restraint device is constituted by these first and second explosives 54a and 54b which are of mutually different types.

The assembly of the squib 2a may be performed, for example, by performing the following procedure.

First, as shown in FIG. 3, after having inserted the second explosive 54b and the inner cap 41 into the outer cap 42 in that order, the outer cap 42 and the inner cap 41 are joined together by welding, so as to constitute the cap unit 40.

Furthermore, separately from these members, the IC main board 52 is welded to the tip end surface 51A of the header 51 so as to join together these two members, and thereby the communication and ignition unit 50 is constituted.

Next, the first explosive 54a and the communication and ignition unit 50 are inserted in turn into the cap unit 40, and the inner cap 41 of the cap unit 40 and the header 51 of the communication and ignition unit 50 are joined together by laser welding.

At this time, the opening end portion 41a of the inner cap 41 extends further outwards to the outer side in the axial direction than the opening end portion 42a of the outer cap 42, by a predetermined length.

Furthermore, the ignition element 30 which is connected to the above described switching element 29 and switching element 31 comes to be disposed at a portion on the tip end of the IC main board 52 where it contacts the first explosive 54a, so that electrical power for ignition of said ignition element 30 and control signals for the control circuit 21 come to be supplied via the header 51.

And, as shown in FIG. 4, the cap unit 40 and the communication and ignition unit 50 which have been joined together into one unit are sealed with a resin molding 55, so that said resin molding 55 spans between the opening end portions 42a and 41a of the outer cap 42 and the inner cap 41 of the cap unit 40, and the portions of the pins 53a and 53b of the communication and ignition unit 50 towards the header 51.

In other words, in the communication and ignition unit 50, the second explosive 54b is charged into a closed chamber which coexists together with the first explosive 54a in the inner portion (the first chamber) of the inner cap 41, and for which the flow of gas to said inner portion is intercepted by the inner cap (the partition wall) 41; in other words, said second explosive 54b is charged into the gap (the second chamber) between the inner bottom surface 42A of the outer cap 42 and the outer bottom surface 41B of the inner cap 41.

With the ignition system which comprises these squibs 2a, 2b, 2c, . . . according to this first preferred embodiment of the present invention, since the electrical power which is required for the ignition element 30 of the squib 2a to ignite the flammable material 54, in other words the first and second explosives 54a and 54b in that order, and to operate the auxiliary restraint device is charged into the capacitor 28 as the control unit 1 supplies electrical power to the bus line 3, when in this state the control unit 1 transmits an ignition execute signal (an ignition execute command) to the squib 2a, the control circuit 21 of the squib 2a makes the switching element 29 and the switching element 31 electrically conductive, and the electrical power which has been charged into the capacitor 28 flows to the ignition element 30, so that the flammable material 54 which is loaded into the squib 2a can be caused to explode and the auxiliary restraint device can be caused to operate.

According to the squibs 2a, 2b, 2c, . . . of this first preferred embodiment of the present invention, even if for example a corrosive gas (for example, chlorine) comes to be emitted from the second explosive 54b, this corrosive gas does not come into contact with the IC main board 52, because the flow route of said gas is intercepted by the inner cap 41, which, as well as functioning as a casing, also functions as a partition wall.

Accordingly, for the first explosive 54a, it is possible to utilize an explosive such as, for example, lead trinitroresorcinate or the like which does not emit corrosive gas, so as to avoid exerting influence upon the IC main board 52 as much as absolutely possible; while, for the second explosive 54b, it becomes possible to utilize an explosive which is appropriate for ensuring the function of the squib 2a as a squib, in other words an explosive such as ZPP or the like which can easily be ignited to evolve gas.

It should be understood that the present invention is not to be considered as being limited to the described preferred embodiments; various alterations and omissions to the details and to the design of any preferred embodiment will be acceptable, provided that the scope of the present invention is not departed from. For example, provided that it is a squib which is employed in a system which utilizes explosive, the object of application of the present invention is not to be considered as being limited to a device for protecting persons riding in a vehicle such as an air bag device or a pre-tensioner device or the like which is fitted to a vehicle; various other types of application are possible.

Figure 5:
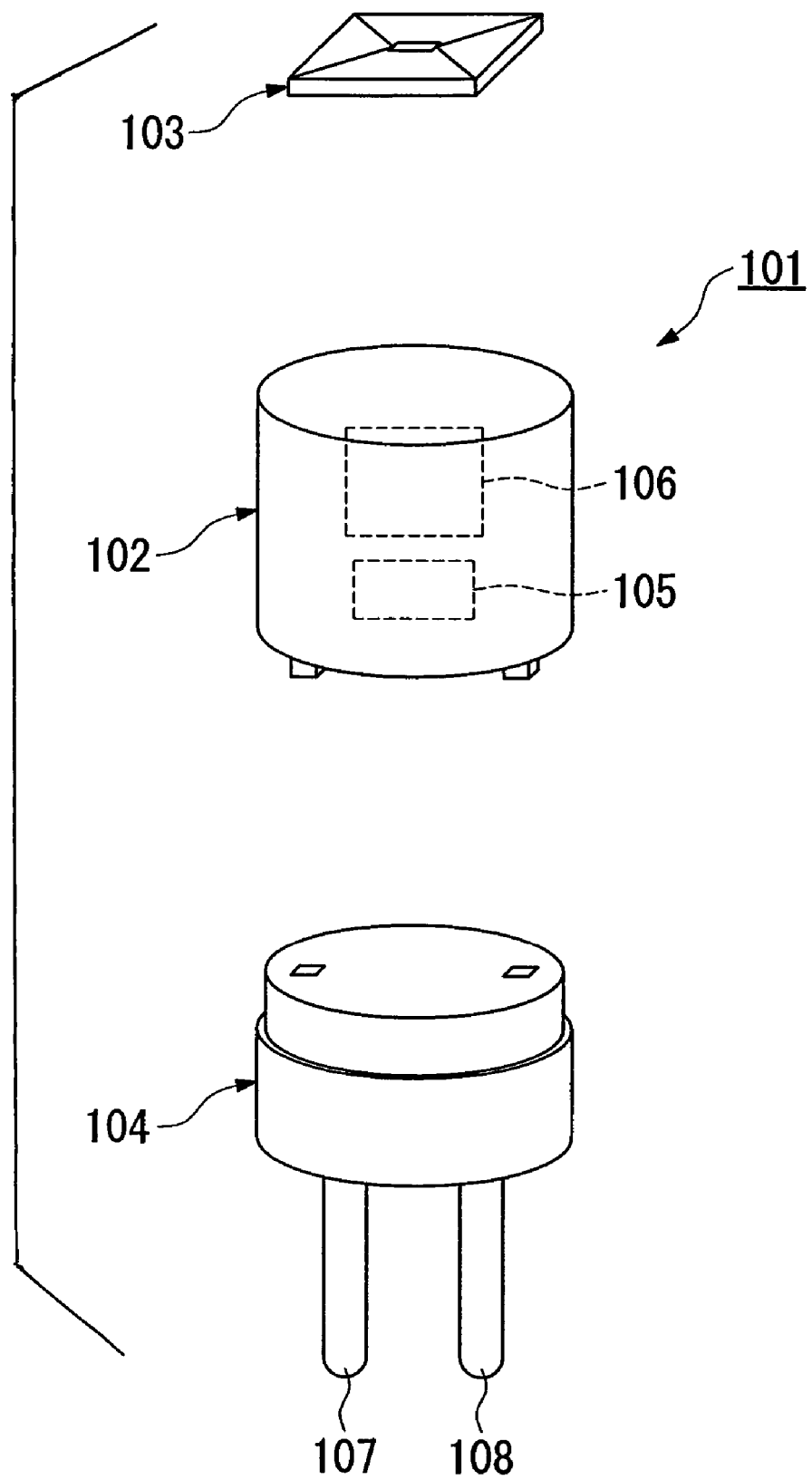
FIG. 5 is an exploded perspective view showing the main structural elements of a squib according to a second preferred embodiment of the present invention.
Figure 6:
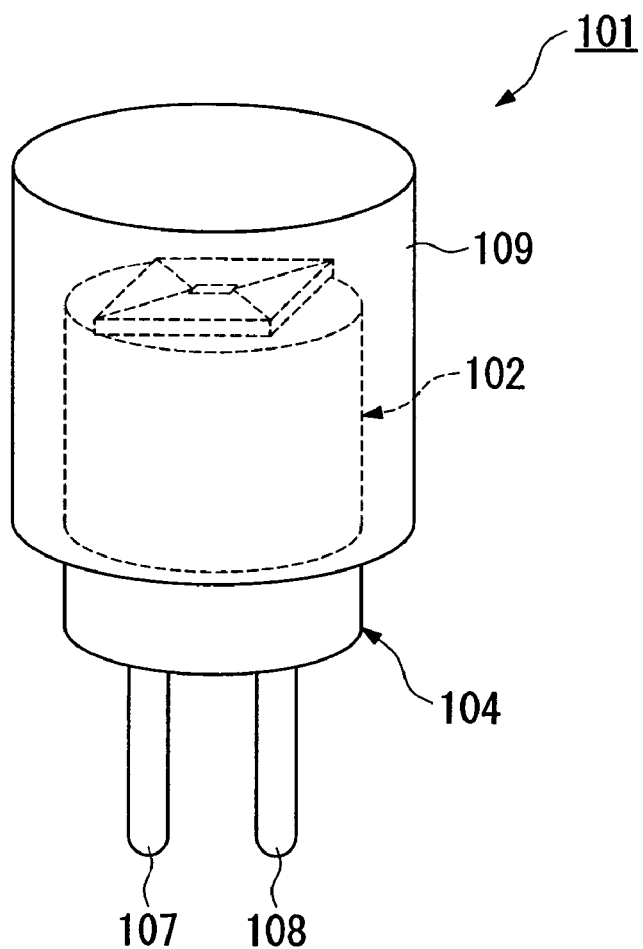
FIG. 6 is a schematic perspective view of a squib which is made by assembling the various structural elements shown in FIG. 5.
Figure 7:
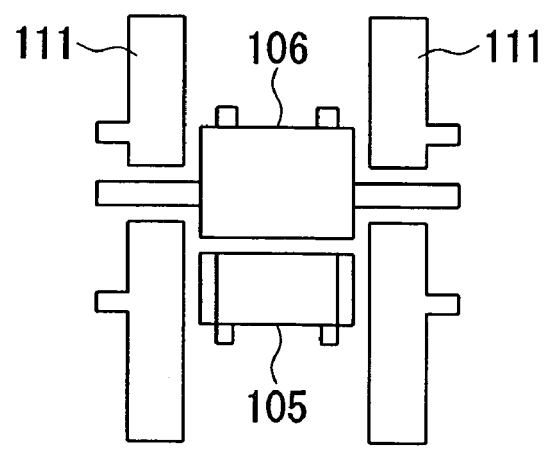
FIG. 7 is an explanatory structural figure showing a communication and ignition circuit shown in FIG. 5.

A squib according to the second preferred embodiment of the present invention will now be explained with reference to FIGS. 5 through 8. FIG. 5 is an exploded perspective view showing the essential structural elements of this squib according to the second preferred embodiment of the present invention; and FIG. 6 is a schematic perspective view of the squib when the various essential structural elements shown in FIG. 5 have been assembled together. And FIG. 7 is an explanatory structural view showing a communication and ignition circuit which was shown in FIG. 5. Moreover, FIG. 8 is a schematic perspective view showing a communication and ignition unit, in which the communication and ignition circuit shown in FIG. 7 has been resin molded.

As shown in these figures, this squib 101 according to the second preferred embodiment of the present invention is made up from a package 102, an ignition element 103, and a header 104. In the following, each of these components will be explained separately.

Figure 8:
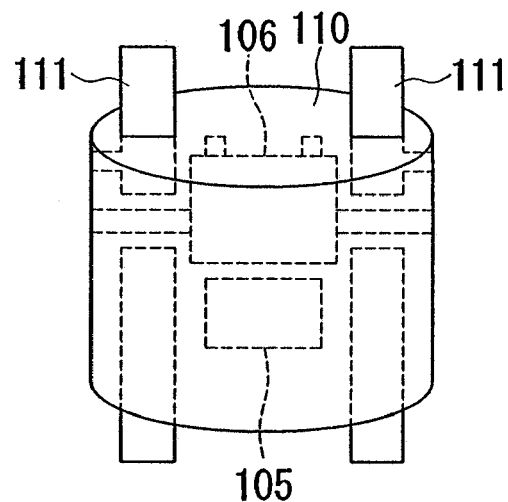
FIG. 8 is a schematic perspective view showing a communication and ignition unit which is made by resin molding the communication ignition circuit shown in FIG. 7.
Figure 9:
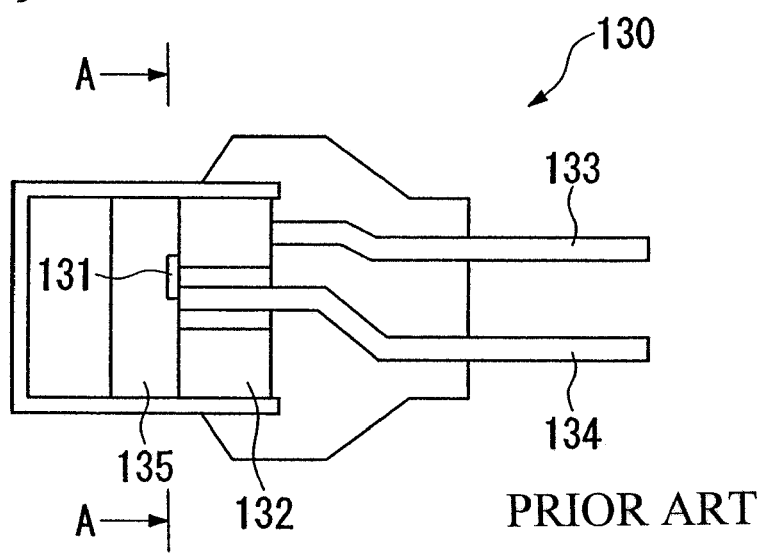
FIG. 9 is a sectional view of a general purpose squib according to the prior art.
Figure 10:
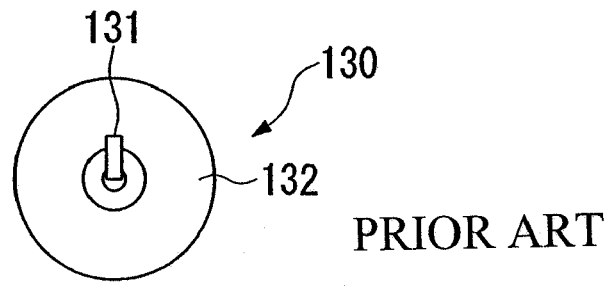
FIG. 10 is a sectional view of the squib of FIG. 9 in a plane shown by the arrows A-A.
Figure 11:
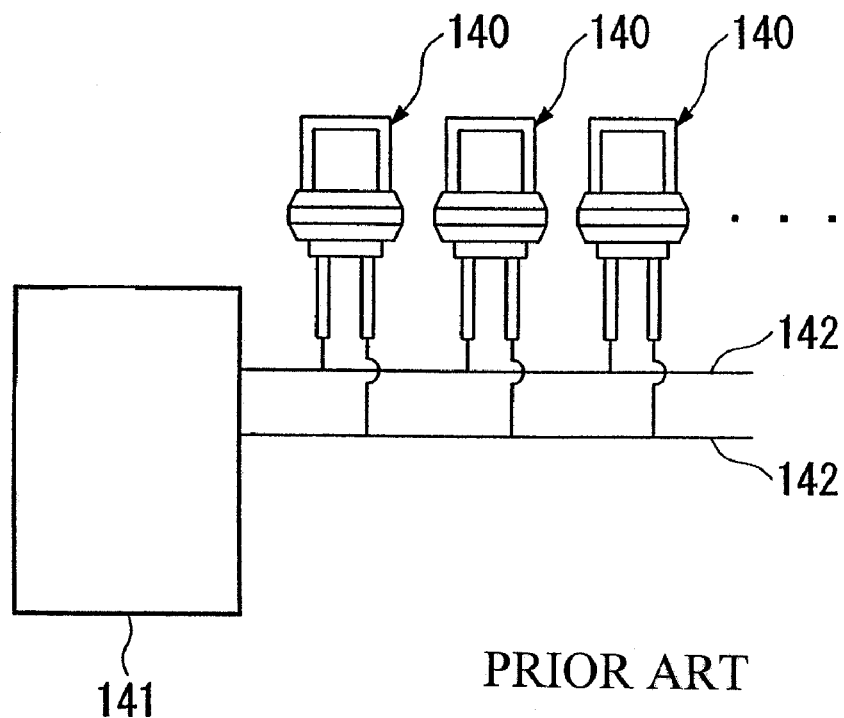
FIG. 11 is an explanatory view of an ignition system which is provided to a bus connection compatible squib.
Figure 12:
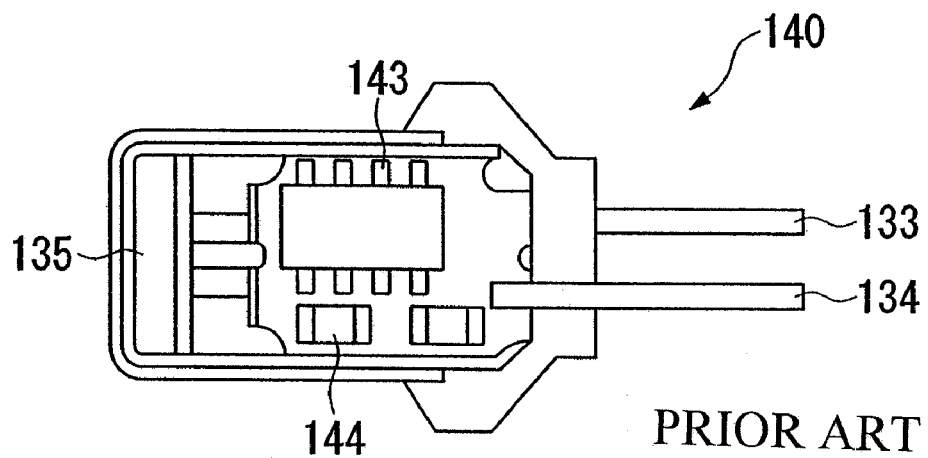
FIG. 12 is a sectional view of this bus connection compatible squib.
Figure 13:
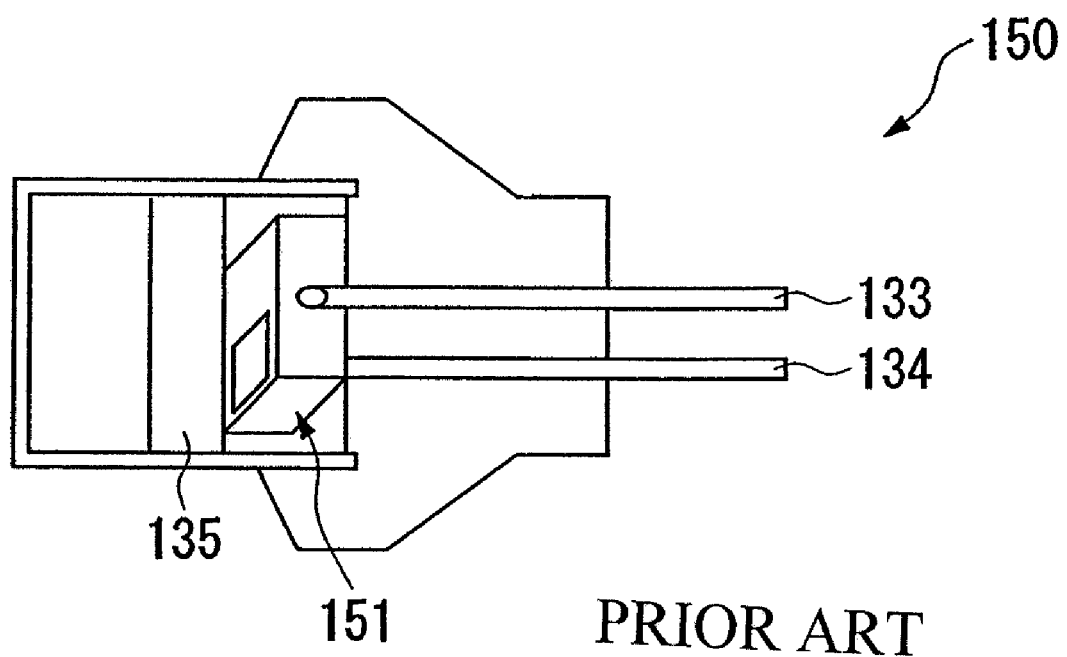
FIG. 13 is a schematic perspective view of a low energy squib which is provided as a package shaped the same as that of a general purpose type squib according to the prior art.

As shown in FIGS. 7 and 8, the package 102 is constructed to house within itself a capacitor 105 which can be charged up with the electrical power which is supplied from an ignition control device (not shown in the figures), an IC ignition circuit 106 which communicates with said ignition control device and performs ignition control, and reeds 111 which are arranged at both the sides thereof, and these elements are joined together into one unit by a resin molding 110. And the overall shape of this package 102 is formed as, roughly, a circular cylindrical shape.

Furthermore, the ignition element 103 comprises a heat producing portion and a fuel portion which is adjacent thereto. When electrical current is supplied to the heat producing portion, heat is generated therein, and this activates the fuel portion; and, when the fuel portion is activated, it becomes excited and a chemical reaction occurs, and a great amount of heat is generated. By making the heat producing portion in this manner as an electrically conductive heat producing portion and a fuel portion, it becomes possible to ignite this squib 101 with lower energy than in the case of a conventional squib.

Furthermore, the header 104 comprises a pair of pins 107 and 108 which are formed to project downward from the main body whose outer shape is formed in a roughly circular cylindrical shape, and it is arranged to be possible to connect the squib 101, via said pins 107 and 108, to a two line type bus line (not shown in the figures) which is an external signal line.

And, along with connecting the lower end portion of said package 102 to said header 104, the unit is formed by fitting the ignition element 103 upon the upper end surface of said package 102 and joining them together into a unit. The squib 101 is made by pressing said unit, in this state, into a mass of flammable material 109 which is held in a roughly circular tube shaped cap (not shown in the drawings).

A number of these squibs 101 are provided to respective air bag devices which are deployed in appropriate locations in the vehicle, such as in the steering wheel and in the dashboard, in the left and right side seats, and in the left and right side portions of the roof and so on; and these squibs 101 are all connected to said ignition control device via said bus.

By doing this, and by providing the IC ignition circuit 106 and said flammable material 109 as being formed separate from said header 104, it is possible to simplify the structure of said header 104, and accordingly it is possible to anticipate reduction of the burden of the work entailed and an amelioration of the cost thereof.

Furthermore, by forming the outer shape of the package 102 as a circular cylinder, along with being able to simplify the shape of the package 102, by inserting the package 102 with the ignition element 103 into the flammable material 109, it becomes possible to ensure the closeness of the contact therebetween by compressing said flammable material 109 in a uniform manner.

Yet further, since it has become unnecessary to insert said ignition element 103 within the package 102, accordingly it becomes possible to ensure the space for storing the capacitor 105, and it accordingly becomes possible to simplify the assembly process for the squib 101, thus making it possible to alleviate the burden of the work entailed. Furthermore, by making the package 102 and the ignition element 103 as separate structures, it becomes possible to manufacture the various elements while benefiting from division of labor, and accordingly it becomes possible to enhance the productivity of manufacture.

What is claimed is:

1. A squib of which a plurality are connected via a common bus line to a control device, and which is adapted for bus connection so as to be capable of selective operation according to electrical energy and an electrical signal supplied from said control device, the squib comprising:
   a communication and ignition unit, which comprises
      a communication and ignition circuit which is electrically connected with said bus line,
      an integrated circuit board on which said communication and ignition circuit and an ignition element are provided, and
      said ignition element being connected to said communication and ignition circuit, the communication and ignition unit being received in an inner cap along with a quantity of a first explosive; and
   a quantity of a second explosive, which is of a different type from said first explosive, disposed between said inner cap and an outer cap which receives said inner cap, wherein
   the inner cap and outer cap are cylindrical bodies each having a closed end,
   the communication and ignition unit is sized so as to abut and confront an inner circumferential surface of the inner cap,
   the inner cap is sized such that an outer circumferential surface of the inner cap abuts and confronts an inner circumferential surface of the outer cap, and
   the respective circumferential surfaces of the inner and outer caps are confronting along an axial distance the entire integrated circuit board is housed within both of the outer cap and inner cap so as to be encircled by the confronting surfaces of the outer cap and the inner cap.

2. A squib as described in claim 1, wherein, said inner and outer caps are connected coaxially together, and said second explosive is pressure packed between an inner surface of the closed end of said outer cap and an outer surface of the closed end of said inner cap.

3. A squib as described in claim 1, wherein said first explosive is pressure packed between said integrated circuit board and an end surface of said inner cap.

4. A squib as described in claim 1, wherein said ignition element directly contacts said first explosive.

5. A squib as described in claim 1, wherein said inner cap shields said communication and ignition unit from contact with said second explosive and from any gas emitted by said second explosive over time.

6. A squib as described in claim 1, wherein said first explosive is disposed in engagement with said integrated circuit board.

7. A squib as described in claim 1, wherein said ignition element directly contacts said first explosive.

8. A squib of which a plurality are connected via a common bus line to a control device, and which is adapted for bus connection so as to be capable of selective operation according to electrical energy and an electrical signal supplied from said control device, the squib comprising:
   a communication and ignition unit sub-assembly, which comprises
      a communication and ignition circuit which is electrically connected with said bus line,
      an integrated circuit board on which said communication and ignition circuit and said ignition element are provided,
      an ignition element which is connected to a first end of said communication and ignition circuit, and
      a header which is connected to a second end of the communication and ignition circuit, the second end opposed to the first end;
   a cap unit sub-assembly, which comprises an inner cap and an outer cap, the inner and outer caps each having a closed end, the inner cap positioned in a nested manner within the outer cap so that the closed end of the inner cap is spaced apart from the closed end of the outer cap so as to form a chamber between the respective closed ends of the inner and outer caps, the inner cap being sized to fill the interior of the outer cap,
   the communication and ignition unit sub-assembly being received in the cap unit sub-assembly within an interior space of the inner cap along with a quantity of a first explosive; and
   a quantity of a second explosive, which is of a different type from said first explosive, is charged in the chamber, which is cut off, with regard to gas flow, from said interior space of the inner cap by the inner cap closed end.

9. A squib as described in claim 8, wherein said first explosive is an explosive which does not emit any corrosive gas.

10. A squib as described in claim 8, wherein said first explosive is lead trinitroresorcinate.

11. A squib as described in claim 8, wherein said first explosive is disposed in engagement with said integrated circuit board.

12. A squib as described in claim 8, wherein said ignition element directly contacts said first explosive.

* * * * *